J. M. ABRAMS.
RESILIENT TIRE.
APPLICATION FILED APR. 12, 1921.
1,392,671. Patented Oct. 4, 1921.
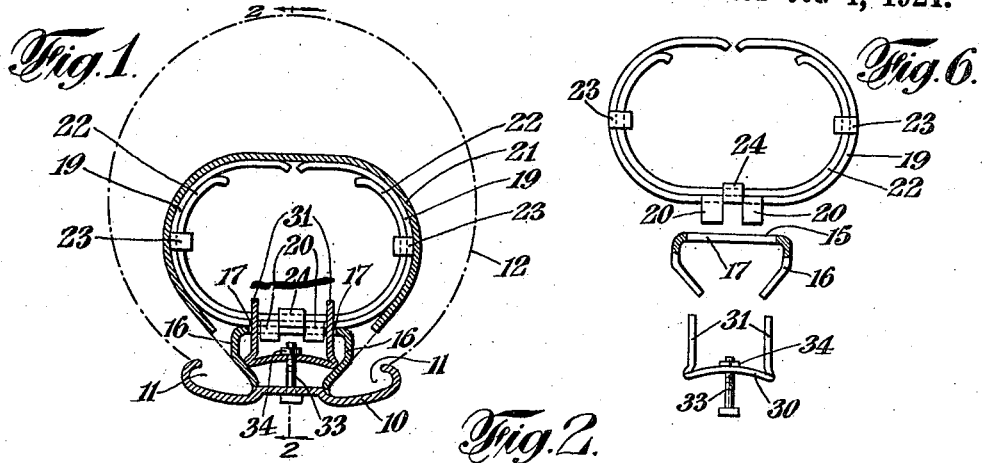
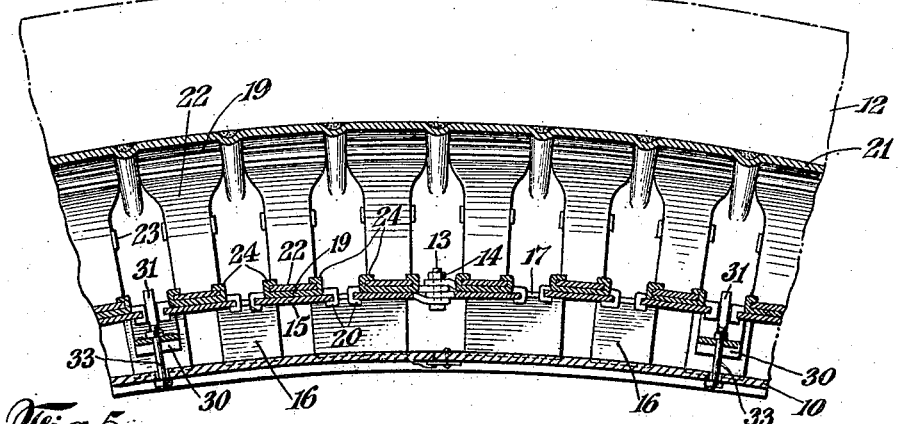
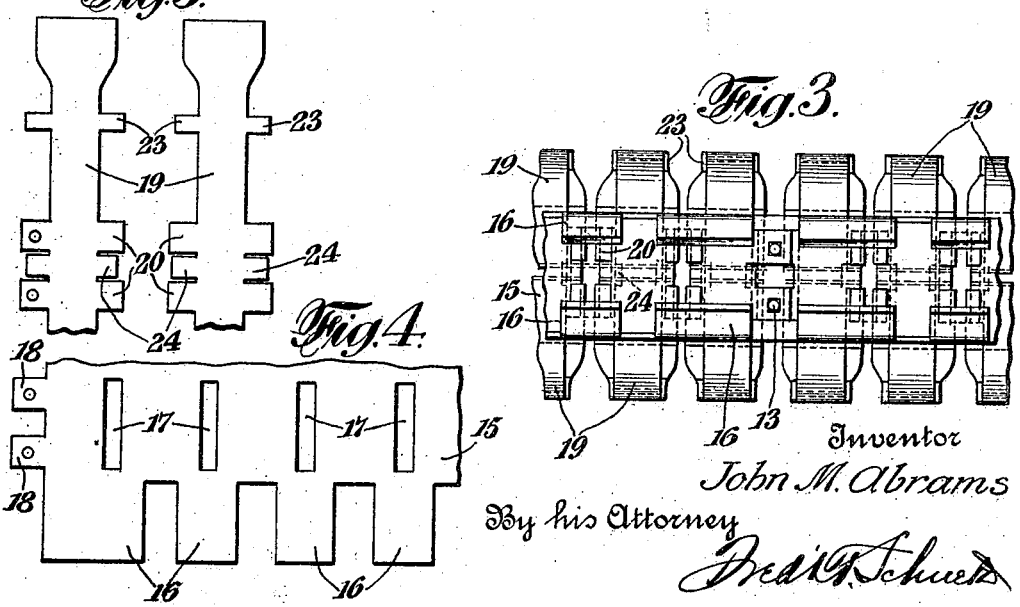
Inventor
John M. Abrams
By his Attorney

UNITED STATES PATENT OFFICE.

JOHN M. ABRAMS, OF BROOKLYN, NEW YORK.

RESILIENT TIRE.

1,392,671.     Specification of Letters Patent.     Patented Oct. 4, 1921.

Application filed April 12, 1921. Serial No. 460,642.

*To all whom it may concern:*

Be it known that I, JOHN M. ABRAMS, a citizen of the United States, and a resident of Brooklyn, in the county of Kings and State of New York, have invented certain new and useful Improvements in Resilient Tires, of which the following is a specification.

The invention relates to a vehicle tire, more particularly to a tire possessing proper resiliency; and is composed of an outer rubber and fabric shoe or casing of the usual or special type, a metal substitute for the usual pneumatic tube and, if desired, an inner protector between the shoe and metal substitute. It has for its object to provide a tire which shall possess the advantages of the well-known pneumatic tire, yet have none of the disadvantages thereof. To this end, the invention consists in providing within the outer shoe or casing a continuous flexible metal member and, generally, a special intermediate protector, the metal member being so formed as to normally distend the said casing and protector and to reinforce same. This metal member will, of course, be puncture proof and, in accordance with the invention, is constructed of two parts affording transversely directed spring arms for imparting the desired resiliency to the tire. In a co-pending application, Serial No. 418,380, filed Oct. 21, 1920, I have shown the resilient arms formed integral with a metal member; and the present invention has for its object to provide a more convenient and less expensive construction whereby, also, it will be possible to renew the outwardly directed arms of the flexible metal member in case of wear or damage thereto.

The invention will best be understood when described in connection with the accompanying drawings, in which—

Figure 1 is a transverse section through the tire and rim.

Fig. 2 is a longitudinal section taken along the line 2—2, Fig. 1.

Fig. 3 is an underneath view of the cushioning means, the rim having been removed.

Fig. 4 is a development of the resilient base member.

Fig. 5 is a fragmentary detail view of the riser members which are adapted to be attached to the base member shown in Fig. 4.

Fig. 6 is a detail view of the riser and base members and of the clamping means for attaching the same to the rim.

Similar characters of reference designate corresponding parts throughout the several views.

Referring to the drawings, 10 designates the rim of a vehicle wheel and is turned upwardly along the two outer edges to receive corresponding beads 11 of the shoe portion 12. The rim constitutes the tire supporting portion of a wheel and the said shoe may be of any well-known or special construction and suitably held to said rim.

The usual pneumatic tube, employed in connection with a shoe in tires of this character, is dispensed with in the improved tire; and the same is replaced by a continuous metal filler member or strip, circularly disposed within said casing and having its two ends secured as by means of suitable bolts 13 and nuts 14, the latter being preferably permanently fixed to one of the ends.

In accordance with the present invention, the filler member is composed of two parts— a base portion 15 consisting of a continuous strip of flexible metal from which are cut drops 16, and an outer portion hereinafter described, the end drops of the strip being made somewhat wider than the intermediate drops. The strip 15 is provided with equally spaced slots 17 as well as lugs 18, the latter being located at the opposite ends for securing same together as through the use of nuts 14 and bolts 13. The drops 16 are designed to be bent inwardly from and under the base; and there is arranged to be secured in the slots 17 risers 19, shown in detail in Fig. 5, and constituting the outer portion of the filler member. These risers consist of a pair of oppositely disposed members, each pair being designed to extend outwardly and over said strip, as shown in Figs. 1 and 2; and the same are adapted to be held to the base member 15 through pairs of laterally extending lugs 20 which are cut from the middle portion of a riser. The risers 19, moreover, are designed to substantially close over until their ends touch along the central portion, as shown in Figs. 1 and 6, said ends, preferably, being somewhat expanded and contacting with the inner wall of the shoe or casing. Or, preferably, an intermediate protector 21 as of leather or composition may be included between the risers and the casing. Moreover, in the use of the protector 21, it is preferred to indent same over a portion transversely to the tire and to fill the indentations with some suitable material as a cement, serving when dry and hard to form permanent bulges, as shown, in the protector between the risers and to cause the said protector to adhere to the shoe.

The drops 16 contact with the lower inner walls of said casing, being forced and held against same in the manner hereinafter set forth and are staggered with reference to the risers. It is prefererd, also, to so form the latter as to provide a substantially elliptical reinforcing member and support for the shoe, said member possessing proper resiliency and whereby greatly increased mileage in the use of the tire results.

In addition to the risers 19, further inside or auxiliary risers 22 may be provided beyond the metal strip to occupy a portion of the risers 19; but the same do not extend entirely to the top of the latter. These auxiliary risers consist of individual pieces of metal which may be punched and separately formed and suitably hardened and tempered. They are held against displacement longitudinally of the tire by means of spurs 23 integral with the risers 19 and by further spurs 24 cut from the middle portion of the risers between the lugs 20, said spurs being brought above the auxiliary risers. However, these inner leaves or auxiliary risers may be omitted, if desired, thereby simplifying the construction and reducing the cost of the filler.

In order to positively lock the shoe to the rim, a plurality of locking or wedging members 30 are provided, the same being in the nature of arched plates having extending arms 31 fitting the slots 17 provided in the continuous metal strip or band 15, and with edges contacting with the sides of the drops 16. Means are provided to draw inwardly these arched plates 30 and thereby to exert the necessary pressure against the sides of the drops 16 to force the beads 11 into the rim 10. To effect this result, threaded bolts 33 extend outwardly through the rim 10 and the members 30, at intervals along the said rim which is raised in the center portion to avoid interference of the heads of the bolts with the top of the felly of the wheel. On each bolt fits a threaded nut 34 which is welded to the said arch plate. It will be understood that by rotating a bolt in the proper direction, pressure may be exerted on the arch plate to draw same inwardly and thereby obtain the desired pressure upon the drops 16. The pressure transmitted to drops 16 and sides of the shoe serves thus to spread the drops and force the beads 11 of the shoe securely into the turned rim portions and insure the holding by same of the tire.

I claim:

1. In a vehicle tire: the combination with a rim and a shoe or casing carried by same; of a continuous metal base member extending throughout the interior of said casing and having drops integral therewith, extending inwardly and under same, and risers removably secured to said base member and extending outwardly and over same.

2. In a vehicle tire: the combiantion with a rim and a shoe or casing carried by same; of a continuous metal base member extending throughout the interior of said casing, provided with slots and having integral drops which extend inwardly and under said base member, and risers having lugs to fit said slots of the base member for securing the risers thereto.

3. In a vehicle tire: the combination with a rim and a shoe or casing carried by same; of a continuous metal base member extending throughout the interior of said casing, provided with transverse slots and having integral drops which extend inwardly and under said base member, and removable risers consisting of strips, the opposite ends thereof extending outwardly and over the base member and the middle portion being provided with lugs designed to fit the slots of the base member for securing the risers thereto.

4. In a vehicle tire: the combination with a rim and a shoe or casing carried by same; of a continuous metal base member extending throughout the interior of said casing, said member being provided with transverse slots and having integral drops extending inwardly and under same, riser members extending outwardly and over said base member and consisting of oppositely extending arms having attaching lugs to fit the slots of said base member, and auxiliary risers retained within said risers, the latter being provided with spurs between their said attaching lugs for holding the auxiliary risers thereto.

5. In a vehicle tire: the combiantion with a rim and a casing carried by same; of a continuous metal base member extending throughout the interior of said casing, said member being provided with transverse slots and having integral drops extending inwardly and under same, riser members extending outwardly and over said base member and consisting of oppositely extending arms having attaching lugs to fit the slots of said base member, and auxiliary risers retained within said risers, the latter being provided with spurs between their said attaching lugs for holding the auxiliary risers thereto and with additional spurs between the ends of their arms and the said attaching lugs for further holding said auxiliary risers.

6. In a vehicle tire: the combination with a rim and a shoe or casing carried by same; of a continuous metal base member extending throughout the interior of said casing and having drops integral therewith, extending inwardly and under same, risers removably secured to said base member and extending outwardly and over same, and means to exert pressure against a portion of said drops to secure the shoe to the rim.

7. In a vehicle tire: the combination with a rim and a shoe or casing carried by same; of a continuous metal base member extending throughout the interior of said casing and having drops integral therewith, extending inwardly and under same, and risers secured to said base member and staggered with respect to said drops thereof and extending outwardly and over the base member.

Signed at Brooklyn in the county of Kings and State of New York, this 6th day of April A. D. 1921.

JOHN M. ABRAMS.